July 15, 1958     F. J. EDWARDS     2,843,372
REFRACTORY MATERIALS
Filed Dec. 28, 1953     2 Sheets-Sheet 1
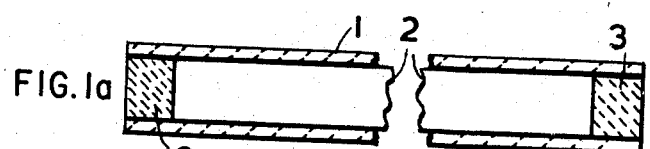
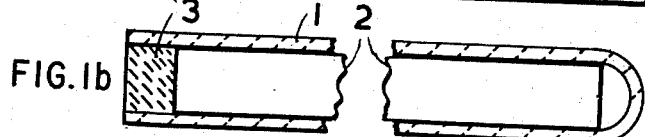
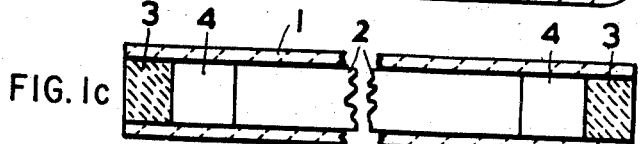
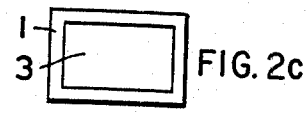
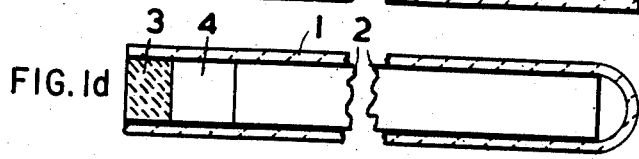
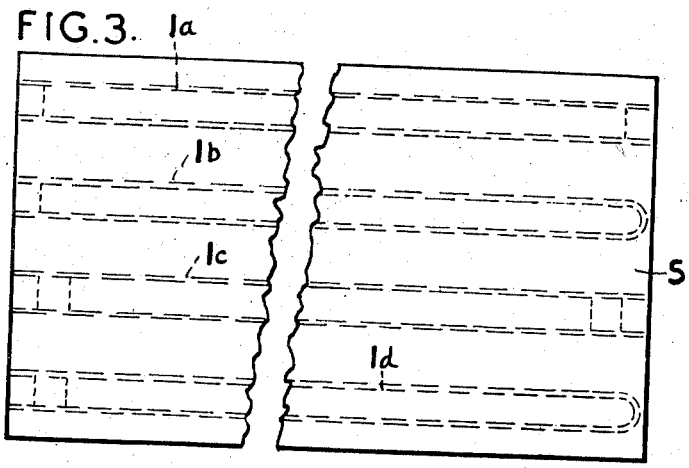
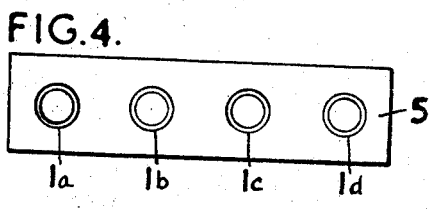
INVENTOR:
FREDERICK JAMES EDWARDS
BY:

July 15, 1958     F. J. EDWARDS     2,843,372
REFRACTORY MATERIALS
Filed Dec. 28, 1953     2 Sheets-Sheet 2
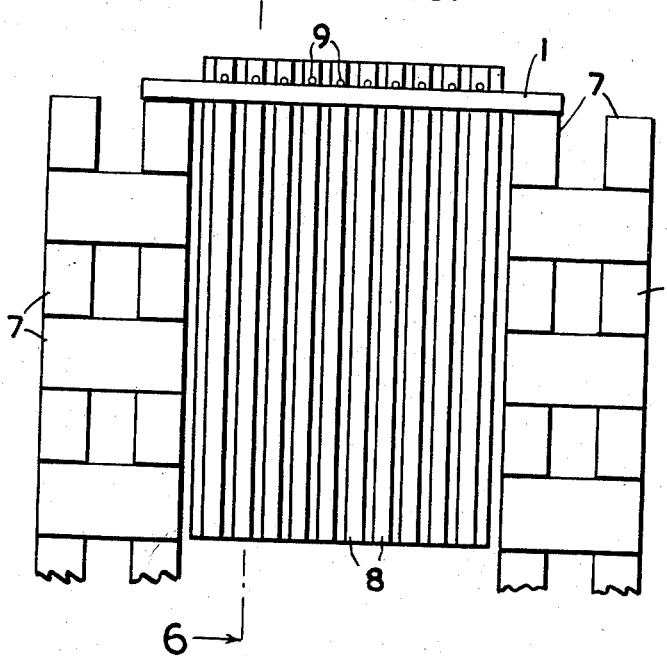
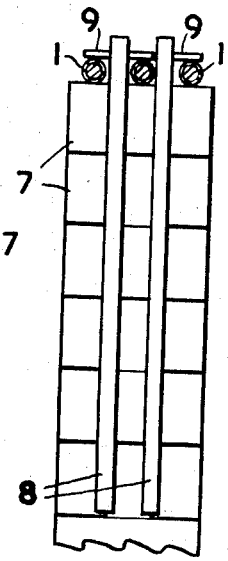
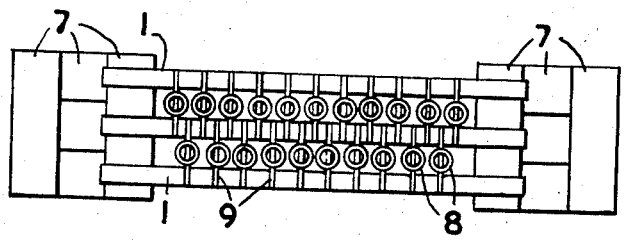
INVENTOR:
FREDERICK JAMES EDWARDS
BY:

United States Patent Office 2,843,372
Patented July 15, 1958

2,843,372
REFRACTORY MATERIALS

Frederick J. Edwards, Newcastle-upon-Tyne, England, assignor to The Thermal Syndicate Limited, Wallsend, England, a British company Application December 28, 1953, Serial No. 400,537

Claims priority, application Great Britain January 7, 1953

8 Claims. (Cl. 263—46)

This invention relates to a method of reinforcing refractory materials in order to increase their strength and rigidity at high temperatures.

It is well known that whereas refractory materials, such as alumina, thoria, beryllia, mullite and sillimanite, are relatively strong and rigid at normal atmospheric temperature and at moderately raised temperatures, their strength and rigidity decreases rapidly when they are heated to temperatures of 1500° C. and above. Thus a structure of refractory material, such as a block, slab, rod or tube, when supported at its ends only, is able to support a substantial weight placed intermediately thereon at normal atmospheric temperature or at moderately raised temperatures, but when subjected to a temperature of 1500° C. and above it is no longer able to support any substantial weight and will sag under its own weight even if quite short.

According to this invention a structure of refractory material chemically compatible with graphite, such as a block, slab, rod or tube of alumina or other typical refractory material, is reinforced by means of one or more self-supporting lengths of graphite, as for example graphite rods, the object being to rely on the relatively strong graphite at elevated temperatures.

Thus an alumina tube having an internal diameter of about 1 inch may be reinforced by inserting therein a graphite rod about ¾ inch in diameter. It is found that such a reinforced tube of a length of, for example, 3 feet, will support appreciable weight at temperatures above 1500° C. when supported only at its ends, whereas without the graphite reinforcement a much shorter tube will give way under much less weight, if not under its own weight, at the said temperatures. It is necessary, of course, that the graphite rod should extend at both ends almost up to or beyond the points at which the tube is supported. The word tube is not to be understood as limited to a circular cross-section.

Referring particularly to a tube assembly, since graphite is not stable in the presence of oxygen at the said high temperatures, it is necessary to exclude air or other oxidising gases from the tube as far as possible. For this purpose the tube should be of material which is substantially impervious. Since all but the very purest graphite disengages gas when heated, it is not advisable to seal both ends of the covering tube, but one end can be sealed and the other end closed by a plug of pervious refractory material, for example a plug of porous alumina. It is also possible to use a tube of which both ends are provided with such plugs, but it is preferred to use a tube of which one end is permanently sealed. Since significant quantities of gas can then only enter the tube, if at all, through the porous plug, attack on the graphite rod will be localised at that end.

According to a further feature of the invention, a material capable of binding oxygen by absorbing or reacting with it, such as graphite, tungsten or molybdenum in the form of a piece or as powder (hereinafter referred to as "sacrifice material") is interposed between the end of the graphite rod and the porous plug. Any oxidising gas entering through the porous plug will then act on this sacrifice material, leaving the rod itself unattacked. The sacrifice material can be replenished from time to time to ensure that the rod remains unaffected. In practice it is found that there is no undue attack on the graphite by air entering through the porous plug because (a) during the "gassing" of the graphite rod upon heating there is a flow of gas outwardly through the porous plug and (b) any carbon dioxide or other gas formed by oxidation of the sacrifice material will also flow outwardly through the plug. The necessity for replacement of the sacrifice material can readily be detected either by visual inspection (after removal of the porous plug) or by measurement of the change in weight of the complete assembly.

Graphite reinforcement is also applicable to slabs, blocks or rods of refractory material. In this case the material may be bored longitudinally from one end to a point adjacent the other end, thus providing one or more passages closed at one end. A graphite rod is then inserted into each passage, followed by the sacrifice material, and the open end closed by a porous plug.

Alternatively, a number of refractory tubes may be embedded in the refractory material in such a way that one end of each of the tubes remains uncovered, and the refractory material then fired to produce the slab or block.

Such reinforced slabs or blocks may be used, for example, to form the roof of a kiln or furnace.

Alternatively, reinforced tubes (as described above) may be used to support refractory slabs (without reinforcement) for the same purpose.

A very advantageous use of the refractory tubes which have been reinforced according to this invention is as supports in the firing of refractory tubes.

In accordance with prior practice, refractory tubes which are to be fired (so-called "green" tubes) are often suspended vertically in the kiln by means of short "pins" of alumina or the like passed through holes pierced in the green tubes adjacent their upper end, the pins being supported on columns of refractory bricks or the like. In view of the tendency for these pins to sag at high temperatures under the weight of the green tubes, the points at which they are supported must be as close together as possible, i. e. the columns of refractory bricks must be arranged as close together as the diameter of the supported green tubes will allow. Consequently a considerable part of the space in the kiln in which the green tubes are fired is occupied by refractory bricks. This space is unproductive and moreover the bricks absorbs a considerable amount of the heat supplied to the kiln.

By replacing the method of suspension of the prior art by refractory tubes reinforced by graphite according to this invention, the columns of refractory bricks may be spaced apart at considerably greater distances, for example 3 feet or more, thus reducing considerably the space occupied by the bricks in the kiln. The green tubes can then be suspended in rows between pairs of reinforced tubes by means of the usual pins which are laid across the pairs of reinforced tubes. Further green tubes can be supported beneath the reinforced tubes on pins passed through holes in refractory shackles slipped over the reinforced tubes. In this way the space within the kiln is utilised mainly for green tubes and the amount of bricks is considerably reduced, so that not only is the output for each firing of the kiln greatly increased but the heat supplied is more efficiently utilised since less is wasted in heating up the bricks.

The invention will now be described with reference to the accompanying drawings, in which:

Figs. 1a to 1d shows longitudinal sections of four tubes reinforced in accordance with this invention;

Figs. 2a to 2d shows end views of tubes of the kind shown in Figs. 1a to 1d.

Fig. 3 is a plan and Fig. 4 an end elevation of a block reinforced in accordance with this invention;

Fig. 5 is an elevation of part of the supporting refractory brick columns and suspended tubes inside of a kiln;

Fig. 6 is a section taken on line 6—6 of Fig. 5; and

Fig. 7 is a plan of Fig. 5.

Referring to Fig. 1, (a) shows a tube of refractory material reinforced by a graphite rod 2 and closed at both ends by porous plugs 3, for example of refractory cement. (b) shows a tube 1 of refractory material, one end of which is closed, containing a rod 2 of graphite. The open end of the tube is closed by a porous plug 3. (c) shows a tube similar to (a) above but also including sacrifice material 4 between the plugs 3 and the rod 2. (d) shows a tube similar to (b) above but also including sacrifice material 4 between the plug 3 and the rod 2.

The tubes shown in Fig. 1 can be of any desired cross-sectional shape, for example any of the shapes shown in Fig. 2.

Referring to Figs. 3 and 4, a refractory block 5 is bored for the reception of a number of reinforced tubes 1. These tubes may be of the kind shown in Fig. 1. Alternatively the bores in the block 5 may be provided with graphite rods and porous plugs, and if desired with sacrifice material. The reinforced block 5 may be used, for example, as the roof of a furnace.

Referring to Figs. 5, 6 and 7, the blocks 7 support reinforced tubes 1 of the kind described above at each end, the tubes 1 supporting in turn a number of green tubes 8 by means of short refractory pins 9 passed through holes provided in the tubes 8 adjacent one end. The advantageous way in which the space within the kiln is utilised may be seen from Figs. 5 and 7.

I claim:

1. As an article of manufacture a refractory element comprising, in combination, an elongated hollow member made of impervious refractory material chemically non-reactable with graphite and formed with at least one open end; a graphite reinforcement rod capable of maintaining its strength at high temperature and being of shorter length than said hollow member being located in the same and having one end spaced from said open end; and at least one plug of porous refractory material located at said open end adjacent said one end of said rod so as to close said open end, whereby the strength of said refractory element is maintained at high temperatures due to said graphite reinforcing rod, and whereby gases developed by said graphite reinforcing rod may escape through said plug of porous refractory material.

2. As an article of manufacture a refractory element comprising, in combination, an elongated member made of impervious refractory material chemically non-reactable with graphite and formed with a bore extending in longitudinal direction and forming openings in both ends of said elongated member; a graphite reinforcing rod capable of maintaining its strength at high temperatures located in said bore spaced from said ends; and plugs of porous refractory material located at said ends so as to close the same, whereby the strength of said refractory element is maintained at high temperatures due to said graphite reinforcing rod and whereby gases developed by said graphite reinforcing rod may escape through said plugs of porous refractory material.

3. As an article of manufacture a refractory element comprising, in combination, an elongated member made of impervious refractory material chemically non-reactable with graphite and formed with a bore extending in longitudinal direction and forming openings in both ends of said elongated member; a graphite reinforcing rod capable of maintaining its strength at high temperatures located in said bore spaced from said ends; plugs of porous material capable of binding oxygen located in said bore adjacent to both ends of said graphite reinforcing rod and spaced from said ends of said elongated member; and plugs of porous refractory material located at said ends so as to close the same, whereby the strength of said refractory element is maintained at high temperatures due to said graphite reinforcing rod, oxygen is prevented from contact with said graphite rod by said plugs of oxygen-binding material, and whereby gases developed by said graphite reinforcing rod may escape through said plugs of porous refractory material.

4. As an article of manufacture a refractory element comprising, in combination, an elongated member made of impervious refractory material chemically non-reactable with graphite and formed with a bore extending in longitudinal direction and forming an opening in one end of said elongated member; a graphite reinforcing rod capable of maintaining its strength at high temperatures located in said bore spaced from said one end; and a plug of porous refractory material located at said one end so as to close the same, whereby the strength of said refractory element is maintained at high temperatures due to said graphite reinforcing rod and whereby gases developed by said graphite reinforcing rod may escape through said plug of porous refractory material.

5. As an article of manufacture a refractory element comprising, in combination, an elongated member made of impervious refractory material chemically non-reactable with graphite and formed with a bore extending in longitudinal direction and forming an opening in one end of said elongated member; a graphite reinforcing rod capable of maintaining its strength at high temperatures located in said bore spaced from said one end; a plug of porous refractory material located at said one end so as to close the same; and a porous plug of material capable of binding oxygen located in said bore between said graphite reinforcing rod and said plug of porous refractory material, whereby the strength of said refractory element is maintained at high temperatures due to said graphite reinforcing rod, oxygen is prevented from contact with said graphite rod by said plug of oxygen-binding material, and whereby gases developed by said graphite reinforcing rod may escape through said plug of porous refractory material.

6. As an article of manufacture a refractory element comprising, in combination, an elongated hollow member made of impervious alumina and formed with at least one open end; a graphite reinforcement rod capable of maintaining its strength at high temperature and being of shorter length than said hollow member being located in the same and having one end spaced from said open end; and at least one plug of porous refractory material located at said open end adjacent said one end of said rod so as to close said open end, whereby the strength of said refractory element is maintained at high temperatures due to said graphite reinforcing rod, and whereby gases developed by said graphite reinforcing rod may escape through said plug of porous refractory material.

7. As an article of manufacture a refractory element comprising, in combination, a tube made of impervious refractory material chemically non-reactable with graphite and formed with at least one open end; a graphite reinforcement rod capable of maintaining its strength at high temperature and being of shorter length than said tube being located in the same and having one end spaced from said open end; and at least one plug of porous refractory material located at said open end adjacent said one end of said rod so as to close said open end, whereby the strength of said refractory element is maintained at high temperatures due to said graphite reinforcing rod, and whereby gases developed by said graphite reinforcing rod may escape through said plug of porous refractory material.

8. As an article of manufacture a refractory element comprising, in combination, a refractory block formed with an elongated bore; a tube located in and substantially filling said bore, said tube being made of impervious refractory material chemically non-reactable with graphite and formed with at least one open end; a graphite reinforcement rod capable of maintaining its strength at high temperature and being of shorter length than said tube being located in the same and having one end spaced from said open end; and at least one plug of porous refractory material located at said open end adjacent said one end of said rod so as to close said open end, whereby the strength of said refractory element is maintained at high temperatures due to said graphite reinforcing rod, and whereby gases developed by said graphite reinforcing rod may escape through said plug of porous refractory material.

References Cited in the file of this patent

UNITED STATES PATENTS

| | | |
|---|---|---|
| 1,599,613 | Fahrenwald | Sept. 14, 1926 |
| 1,721,442 | Frink | July 16, 1929 |
| 1,751,136 | Dovel | Mar. 18, 1930 |
| 1,775,396 | Jackman et al. | Sept. 9, 1930 |
| 2,152,190 | Henderson | Mar. 28, 1939 |
| 2,474,301 | Blaha | June 28, 1949 |
| 2,491,625 | Slick | Dec. 20, 1949 |
| 2,532,990 | Blaha | Dec. 5, 1950 |

FOREIGN PATENTS

| | | |
|---|---|---|
| 542,801 | Great Britain | Jan. 28, 1942 |